Jan. 19, 1937.  S. M. NAMPA  2,068,460
CAR LOADING DEVICE
Filed Nov. 21, 1934
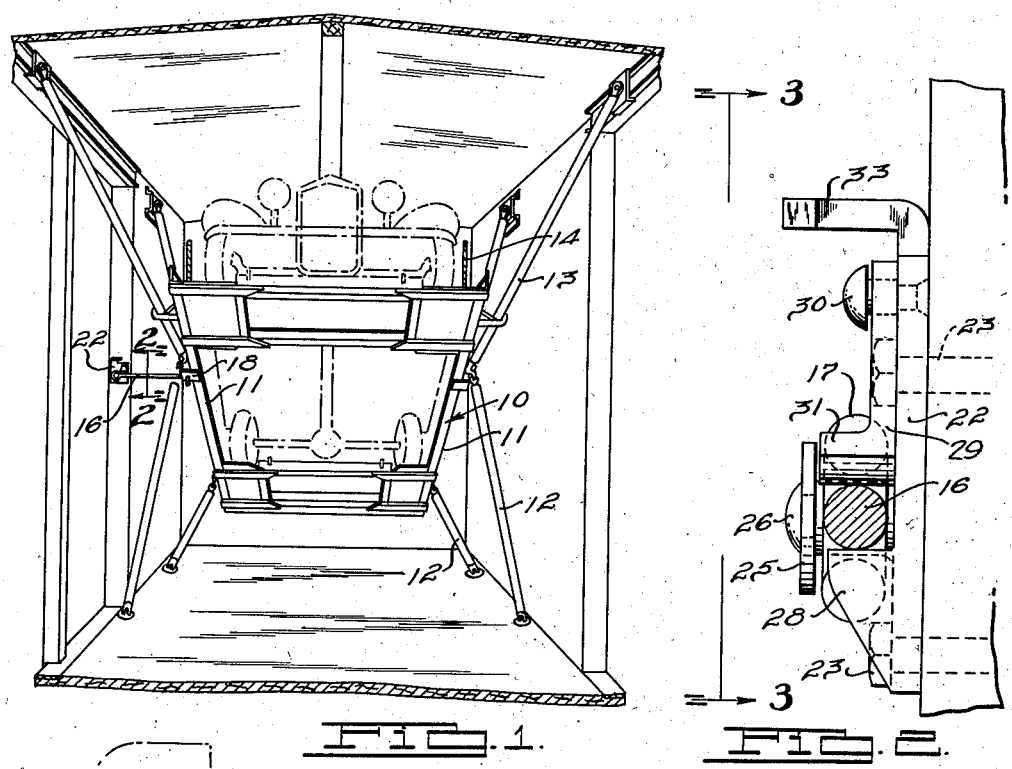
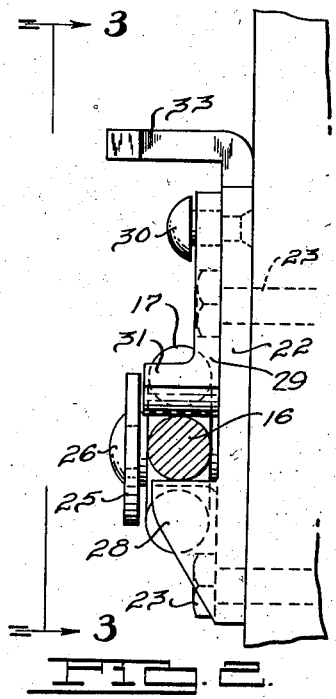
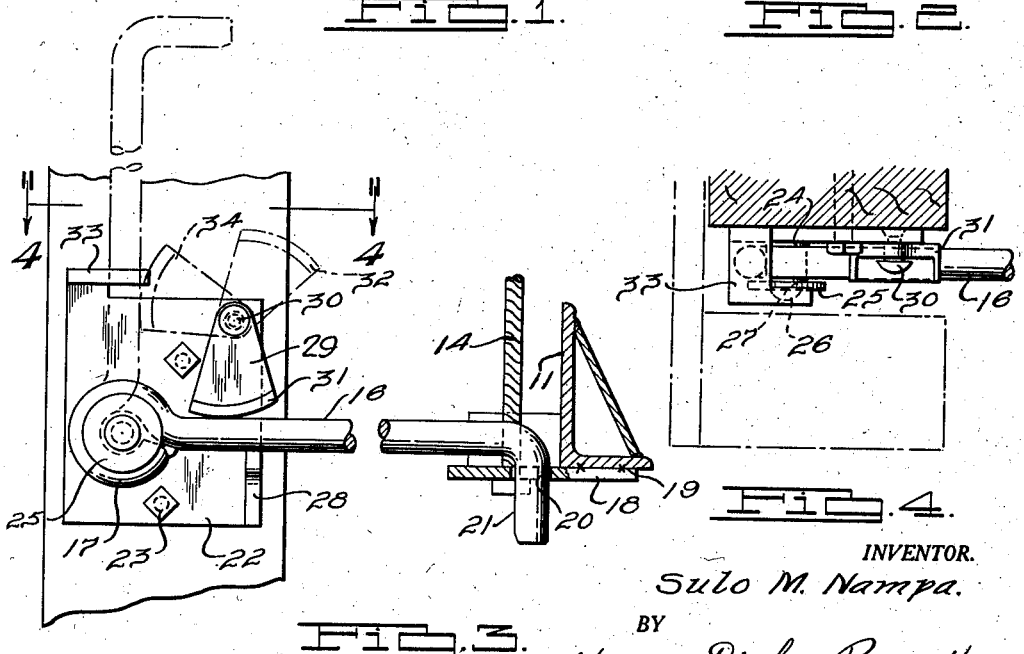
INVENTOR.
Sulo M. Nampa.
BY
Harness, Dickey, Pierce & Hann.
ATTORNEYS.

Patented Jan. 19, 1937

2,068,460

UNITED STATES PATENT OFFICE 2,068,460

CAR LOADING DEVICE

Sulo M. Nampa, Detroit, Mich., assignor to The Worth Company, a corporation of Michigan Application November 21, 1934, Serial No. 754,012

10 Claims. (Cl. 105—368)

The invention relates to car loading devices and it has particular relation to a device for loading automobiles in freight cars.

Particularly the invention involves an improvement in a car loading device such as disclosed in the co-pending application for patent of Samuel D. Butterworth, Serial Number 646,830, filed December 12, 1932.

The object of the invention is to provide an improved device for anchoring an automobile loading frame or the like in a freight car and for preventing side sway of the frame during movement of the freight car.

For a better understanding of the invention, reference may be had to the accompanying drawing, illustrating one form of the invention, wherein:

Fig. 1 illustrates the interior of a freight car provided with a decking frame and means for preventing side sway, as constructed according to one form of the invention.

Fig. 2 is a cross-sectional view on a larger scale, taken substantially along the line 2—2 of Fig. 1.

Fig. 3 is a view taken substantially along the line 3—3 of Fig. 2.

Fig. 4 is a cross-sectional view taken substantially along the line 4—4 of Fig. 3.

Referring to Fig. 1, the automobile supporting and decking frame is indicated at 10 and includes side angle irons 11, and when the frame is in its semi-decking position, it is supported by means of releasable bracing rods 12 and upper rods 13. Cables 14, connected to a hoisting mechanism (not shown) are employed for raising the frame to a semi-decking position and lowering the frame to the floor. The construction of this equipment in greater detail is set forth in the co-pending application for patent previously identified.

For preventing side sway of the frame during transportation, one or more hooks 16 are employed, each of which has an eye 17 for connecting it to the side wall of the freight car. As best shown by Fig. 3 the side angle iron 11 has a plate 18 welded or otherwise secured to its underside as indicated at 19, and this plate projects beyond the edge of the frame and is provided with an opening 20 for receiving a hook portion 21 of the hook 16. For pivotally mounting the hook 16 on the side wall of the car and particularly as shown, on the face of the door opening in the freight car, a metal plate 22 is provided, which is secured to the door facing by means of bolts 23. The eye portion 17 of the hook is pivotally held on the plate 22 by means of a pin 24 and this pin may be secured to the plate in any suitable way, such as by welding or by being threaded therethrough, although an integral or welded construction is preferable. The outer portion 17 of the hook receives the pin 24 and on the outer side of the eye portion a washer 25 is provided and at the outer side of this washer the pin has a head 26 for holding the washer in place. Preferably, the washer is mounted on a reduced portion 27 at the outer end of the pin, so that the washer has a fixed position. It will be noted that the eye portion of the hook is not tightly fitted between the washer and the plate 22 so that a fairly loose fulcrum is provided.

For holding the hook in its frame engaging position as shown by Fig. 3, a projection 28 is provided on the plate for supporting the lower side of the shank of the hook, while a cam member 29 engages the upper side of the shank and holds it positively in position. This cam member is pivoted as indicated at 30, on the upper edge of the plate and has a curved rim portion 31 around its outer edge adapted to have a camming engagement with the hook shank. The arrangement is such that any tendency of the hook to move upwardly causes the cam member to have increased binding engagement with the shank and owing to the fact that the cam member will normally hang downwardly because of gravity, it is apparent that a positive lock is provided for preventing upward movement of the hook and its disengagement from the frame.

When it is desired to disengage the hook from the frame, the cam member 29 is turned for example, to its broken line position as indicated at 32, and then the hook may be moved past the rim portion 31 as the loose fulcruming engagement of the eye portion 17 with the pin 24 will permit enough lateral movement of the hook to allow it to clear the rim portion of the cam. After the hook moves past the rim portion of the cam, it is seated in a notched leg 33 formed at the upper edge of the plate, and then the cam may be turned into its position indicated in broken lines at 34, where it drops downwardly and bindingly holds the hook within the notched leg 33. It has been mentioned that the loose fulcruming engagement of the eye portion 17 with the pin 24 will permit swinging movement of the hook past the rim portion 31 when the cam is in the dotted line position indicated at 32 but if found desirable, a portion of the hook shank projecting beyond the edges of the plate 22 may be angled slightly and away from the plane of the plate 22 so that the angled portion would clear the rim of the cam when the cam is in the position indicated at 32, even though the fulcrum of the eye portion is not as loose as mentioned.

It will be noted that the hook when in its operative position, as shown by Fig. 3, is held against vertical movement and this is desirable in that the frame may be lowered without manually disengaging the hook. Thus, the workman may lower the frame without disengaging the hooks, as the frame will merely move downwardly and out of engagement with the hook, thereby avoiding any binding or bending of parts as might occur if the frame were lowered without disengaging the hooks manually in the event the hooks could swing downwardly with the frame movement.

Furthermore, as the frame is lowered and the frame swings toward the center of the car, the cables 14 finally engage the hooks and push them toward the center of the car, it being understood that the looseness of the pivotal connection between the hook and pin 24 permits this movement of the hooks. The final result of this action of the cables is to push the hooks off of the projections 28, and then the hooks fall downwardly into out of the way positions in an automatic manner. This procedure simplifies the unloading operation, as the hooks automatically are disengaged from the frame and are automatically moved to out of the way positions.

The invention provides a very positive connection between the wall of the freight car and the decking frame for preventing side sway of the latter during movement of the freight car. It is apparent that once the hook is engaged with the frame and the cam 29 engages the shank portion of the hook, upward movement of the hook is positively prevented unless the cam is moved purposely to a disengaging position. It is also apparent that the cam provides a means for positively locking the hook in a vertical position when it is not in use. There is no danger of the hook moving out of its operative position during jolting of the freight car as any jolting results in a still stronger binding action between the cam and the hook. Thus, the hook is positively maintained in position unless the cam is manually moved from its engaging relation with the hook.

Although only one form of the invention has been described and illustrated in detail, it will be apparent to those skilled in the art that various modifications may be made without departing from the scope of the appended claims.

I claim:

1. In combination, a support, a hook member pivoted on the support, means on the support for limiting swinging movement of the hook to between two positions, and a cam member pivoted on the support within the path of movement of the hook between said two positions and adapted to be swung to lock the hook member in either of such positions, said hook and cam being adapted to pass each other when both are intermediate their respective two positions.

2. In combination with a freight car, a frame for elevating and supporting an automobile in the car, a hook pivotally mounted on the car and engageable with the frame for holding the latter against horizontal movement, and means for automatically causing the hook to become disengaged from the frame when the latter is lowered.

3. In combination with a freight car, a frame for elevating and supporting an automobile in the car, a hook pivotally mounted on the car and engageable with the frame for holding the latter against horizontal movement, and means for holding the hook in its frame engaging position independently of a lowering movement of the frame whereby lowering of the frame automatically disengages said hook.

4. In combination with a freight car, a frame for elevating and supporting an automobile in the car, a hook pivotally mounted on the car and having a hook portion adapted to engage an aperture in the frame to prevent horizontal movement thereof, and means for holding the hook in its operative position when the frame is lowered so as to cause automatic disengagement of the hook.

5. In combination with a freight car, a frame for elevating and supporting an automobile in the car, a hook pivotally mounted on the car and having a hook portion adapted to engage an aperture in the frame, and means for holding the hook in its operative position when the frame is lowered so as to cause automatic disengagement of the hook, hoisting means for lifting and lowering the frame, and means causing the hoisting means to release the hook from said holding means after disengagement of the hook from the frame.

6. In combination, a freight car equipped with a loading device for automobiles, a support secured to said car and positioned adjacent the loading device, a hook pivoted to said support on a longitudinal axis and adapted to swing from a vertical position above the pivot to a horizontal position into engagement with the loading device, and a unitary locking device adapted to lock said hook in either of said positions.

7. In combination, a freight car equipped with a loading device for automobiles, a support secured to said car and positioned adjacent the loading device, a hook pivoted to said support on a longitudinal axis and adapted to swing from a vertical position downwardly to a horizontal position into engagement with the loading device, and a unitary locking device adapted to lock said hook in either of said positions, said locking device comprising a cam pivoted to said support and adapted to engage the hook and lock the same by gravity action in either of said positions.

8. In combination, a freight car having a floor, a movable loading frame mounted in said car and adapted to be moved from a loading and unloading position to a load carrying position above the floor level, a member carried by said car and adapted to engage and prevent lateral movement of said frame when in said load carrying position, and means automatically operable upon movement of said frame from load carrying position to said loading and unloading position to disengage said member from the frame.

9. In combination with a freight car, a swinging frame adapted to support an automobile in elevated position in the car, a member pivotally connected to the body of the car and adapted upon relative movement with respect to and toward said frame to engage the frame and prevent lateral movement thereof when the frame is in elevated position, stop means adapted to prevent downward movement of said member when the frame is lowered whereby lowering of said frame automatically effects releases thereof from said member, and means attached to the frame and adapted upon longitudinal movement of the frame to displace said member from the stop means whereby said member may fall by gravity into inoperative position.

10. In combination, a freight car equipped with a loading device for automobiles, a support secured to said car positioned adjacent the loading device, a hook member pivoted on the support on a longitudinal axis and adapted to swing from a vertical position downwardly to a horizontal position into engagement with the loading device, means for limiting the movement of said hook beyond said two positions, and a cam member pivoted on the support within the path of movement of the hook between said two positions and adapted to be swung to lock the hook member in either of such positions, said hook and cam being adapted to pass each other when both are intermediate their respective two positions.

SULO M. NAMPA.